(12) United States Patent
Karpman et al.

(10) Patent No.: US 11,319,834 B2
(45) Date of Patent: May 3, 2022

(54) ON-BOARD ESTIMATOR SENSOR DRIFT DETECTION IN ENGINE CONTROL

(71) Applicant: United Technologies Corporation, Farmington, CT (US)

(72) Inventors: Boris Karpman, Marlborough, CT (US); Richard P. Meisner, Glastonbury, CT (US); Subhradeep Chowdhury, Rocky Hill, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 282 days.

(21) Appl. No.: 15/879,849

(22) Filed: Jan. 25, 2018

(65) Prior Publication Data
US 2019/0226354 A1 Jul. 25, 2019

(51) Int. Cl.
F01D 21/14 (2006.01)
F01D 21/00 (2006.01)
F02C 9/00 (2006.01)
G05B 9/03 (2006.01)

(52) U.S. Cl.
CPC ........... *F01D 21/14* (2013.01); *F01D 21/003* (2013.01); *F02C 9/00* (2013.01); *F05D 2220/323* (2013.01); *F05D 2260/80* (2013.01); *F05D 2260/81* (2013.01); *F05D 2260/84* (2013.01); *F05D 2270/094* (2013.01);
(Continued)

(58) Field of Classification Search
CPC .......... F01D 21/14; F01D 21/003; F02C 9/00; F05D 2270/094; F05D 2270/46; F05D 2270/71; F05D 2260/84; F05D 2220/323; F05D 2260/81; F05D 2260/80; G05B 9/03
See application file for complete search history.

(56) References Cited

U.S. PATENT DOCUMENTS 4,423,594 A   1/1984 Ellis
5,775,089 A * 7/1998 Skarvan ............... F01D 17/08
                                                60/39.281
(Continued)

FOREIGN PATENT DOCUMENTS

EP    2570877 A1    3/2013
WO    2014152701 A1 9/2014

OTHER PUBLICATIONS

Search Report for European Application No. 19153816.4; Application Filing Date Jan. 25, 2019; dated Jul. 22, 2019 (7 pages).

Primary Examiner — Thomas Ingram
Assistant Examiner — Omar K Morsy
(74) Attorney, Agent, or Firm — Cantor Colburn LLP

(57) ABSTRACT

An engine control system includes an electronic hardware engine controller in signal communication with at least one engine sensor, which measures an engine operating parameter (Ycrtr_t). The engine controller generates a synthesized engine operating parameter (Ycrtr) calculates an error (ERRcrtr) between the engine operating parameter (Ycrtr_t) and the synthesized engine operating parameter (Ycrtr). The engine controller further determines a corrector error parameter (Xcrtr) and determines a faulty sensor among the at least one engine sensor based on a comparison between the error value (ERRcrtr) and the corrector error parameter (Xcrtr).

15 Claims, 11 Drawing Sheets

(52) U.S. Cl.
CPC ...... *F05D 2270/46* (2013.01); *F05D 2270/71* (2013.01); *G05B 9/03* (2013.01)

(56) References Cited

U.S. PATENT DOCUMENTS

| | | | | |
|---|---|---|---|---|
| 7,120,536 | B2* | 10/2006 | Peron | F02D 35/023 |
| | | | | 701/114 |
| 7,246,303 | B2* | 7/2007 | Bansal | H04L 69/40 |
| | | | | 714/704 |
| 7,302,942 | B2* | 12/2007 | Buck | F02D 41/222 |
| | | | | 123/676 |
| 8,090,456 | B2 | 1/2012 | Karpman et al. | |
| 8,668,434 | B2* | 3/2014 | Karpman | F01D 21/003 |
| | | | | 415/7 |
| 2004/0030417 | A1* | 2/2004 | Gribble | G05B 9/02 |
| | | | | 700/29 |
| 2006/0184255 | A1 | 8/2006 | Dixon et al. | |
| 2008/0294311 | A1* | 11/2008 | Henson | G01D 1/18 |
| | | | | 701/31.4 |
| 2014/0352396 | A1* | 12/2014 | Rauh | G01D 5/24461 |
| | | | | 73/1.01 |
| 2016/0017813 | A1 | 1/2016 | Karpman et al. | |
| 2016/0180274 | A1* | 6/2016 | Zwakhals | G06Q 10/06315 |
| | | | | 705/7.25 |

* cited by examiner

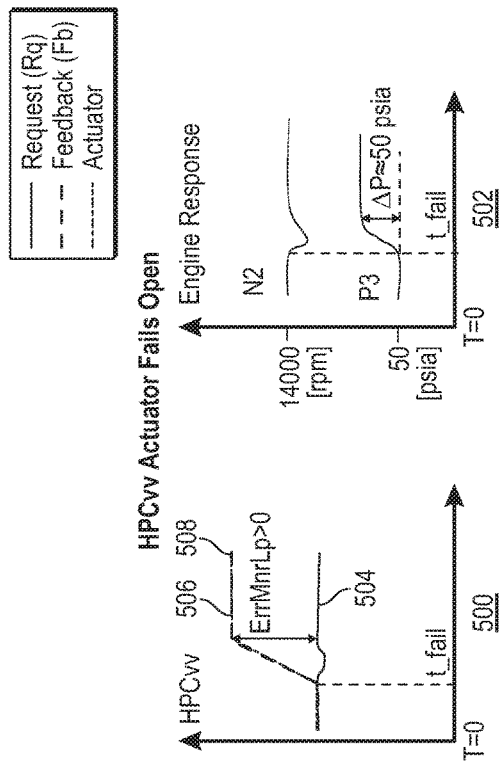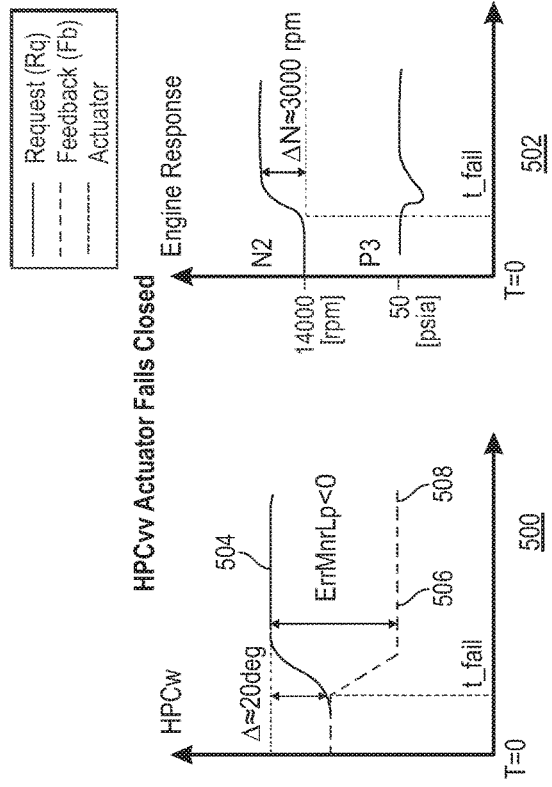
FIG. 5A
FIG. 5B

ON-BOARD ESTIMATOR SENSOR DRIFT DETECTION IN ENGINE CONTROL

BACKGROUND

Exemplary embodiments pertain to the art of electronic control systems, and more particularly, to engine control systems of aircraft vehicles.

Engine parameter on-board synthesis (EPOS) models can be utilized to implement a real-time control system for controlling fluid based engineering systems. Conventional EPOS models synthesize (i.e., estimate) one or more physical responses based on various measured parameters of the engine.

BRIEF DESCRIPTION

Disclosed is an engine control system comprising an electronic hardware engine controller in signal communication with at least one actuator configured to operate at a plurality of different positions that control operation of an engine, and at least one actuator sensor configured to measure an actuator position. The engine controller is configured to generate a synthesized actuator position independently from the measured actuator position. The engine controller adjusts the position of the at least one actuator based on the synthesized actuator position in response to detecting at least one of a faulty actuator and a faulty actuator sensor.

Also disclosed is a method of controlling a turbine engine. The method comprises measuring, via at least one actuator position sensor, an actuator position of at least one actuator configured to operate at a plurality of different positions to control the turbine engine. The method further comprises measuring, via at least one actuator position sensor, an actuator position of at least one actuator configured to operate at a plurality of different positions to control the turbine engine. The method further comprises controlling the at least one actuator based on the synthesized actuator position, in response to detecting at least one of a faulty actuator and a faulty actuator position sensor.

BRIEF DESCRIPTION OF THE DRAWINGS

The following descriptions should not be considered limiting in any way. With reference to the accompanying drawings, like elements are numbered alike:

FIGS. 5A and 5B are signal diagrams depicting detection strategies for detecting operating faults of an actuator according to non-limiting embodiments;

DETAILED DESCRIPTION

An EPOS model is built off of a component level physics based non-iterative mathematical abstraction of a gas turbine engine. Such an EPOS model can be integrated into a digital electronic hardware engine controller for the purpose of synthesizing non-measured engine control feedbacks, as well as other engine parameters used for detecting and accommodating faults in engine and control hardware. The EPOS model described herein enables detection of actuator sensor and engine sensor in-range (often referred to as 'soft') failures. The system described here is also capable of detecting analog-to-digital (AD) conversion/voltage LVDT coil range fault failures (often referred to as 'hard'). In this manner, an engine control system is provided which can accommodate or compensate for these actuator sensor and engine sensor faults.

A detailed description of one or more embodiments of the disclosed apparatus and method are presented herein by way of exemplification and not limitation with reference to the Figures.

Figure 1:
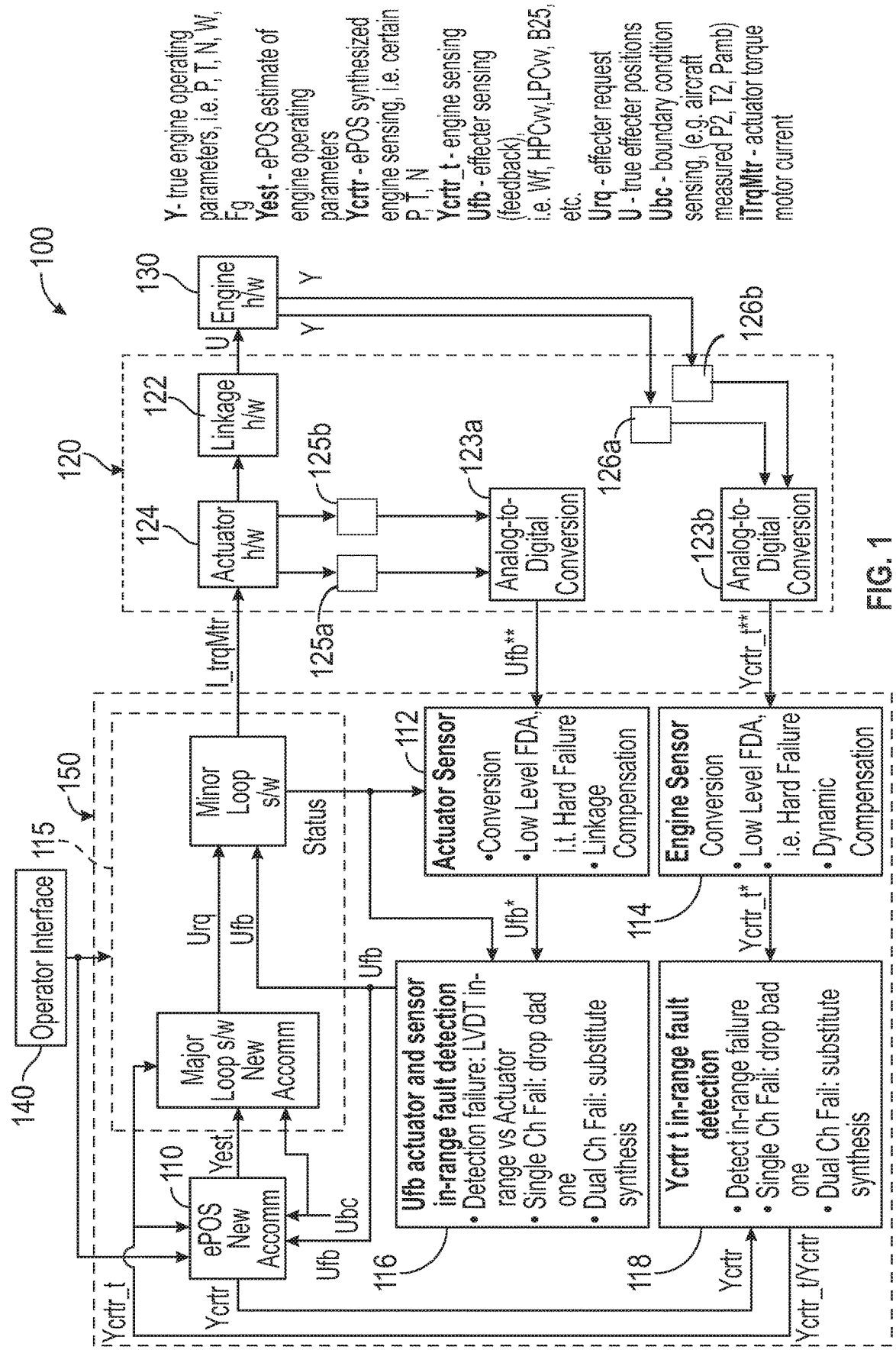
FIG. 1 is a block diagram of an engine control system according to a non-limiting embodiment.

Turning now to FIG. 1, an engine control system 100 is illustrated according to a non-limiting embodiment. The engine control system 100 may be implemented to detect and manage specific failed conditions of control hardware components 120 such as, for example, the actuator 124, one or more actuator sensors 125a and 125b, and/or one or more engine sensors 126a and 126b. As related to these failure conditions, the engine control system 100 operates to continue meeting aircraft requirements to propulsion system, including some conditions operating at somewhat reduced capacity and efficiency, while preventing further damage to control hardware 120 and engine hardware 130 thus improving aircraft system operation.

During operation, one or more control hardware components 120 may experience a fault condition. Some exemplary fault conditions that may be experienced include, but are not limited to, soft failures such as, for example, sensor in-range failures (e.g., engine sensor in-range failures, actuator sensor in-range failures, etc.) and/or hard failures such as, for example, analog-to-digital (AD) conversion faults, E1/E2 voltage faults, and linear variable differential transformer (LVDT) coil range faults. The component level physics based mathematical abstraction of the engine 130 and individual components of the engine 130 performed by the EPOS 110 assists in detection and accommodation of such faults. As such, the engine control system 100 can actively perform real time detection of the soft failures and/or hard failures described herein, in addition to accommodating or compensating for these soft failures and/or hard failures to maintain target operating conditions and control laws.

The engine control system 100 includes various hardware components 120 in signal communication with an electronic hardware engine controller 150. The hardware components 120 include, but are not limited to, one or more engine actuators 124, one or more actuator sensors 125a and 125b, one or more engine sensors 126a and 126b, and one or more analog-to-digital converters 123a and 123b. The engine actuators 124 are connected to the engine 130 via linkage hardware 122. The actuator sensors 125a and 125b are in signal communication with a respective engine actuator 124. The engine sensors 126a and 126b are in signal communication with the engine 130. The outputs of the actuator sensors 125a and 125b, and the engine sensors 126a and 126b are delivered to the analog-to-digital converters 123a and 123b.

The engine controller 150 includes an engine parameter on board synthesis (EPOS) module 110. The EPOS module 110 can be constructed as an electronic hardware controller that includes memory and a processor configured to execute various algorithms, software programs, and computer-readable program instructions stored in the memory. The memory of the EPOS module 110 can also store individual models, thresholds, and target parameters which are utilized for executing respective control algorithms.

Control demands may be generated by an operator interface 140 and may be received by the EPOS module 110. For example, the operator interface 140 may be constructed as a real-time interface such as a cockpit navigation system and/or an operator workstation. Additionally or alternatively, the operator interface 140 may include another, more generalized process control interface, which is suitable for logging control commands to the engine control module 150, including, for example, a guidance, navigation, and control computer or autopilot system(s). Further, control demands may be generated by an internal memory hardware or any other internal programming operatively associated with the engine control module 150. The control signals output from the operating interface 140 can also be delivered to a control law module 115, which is described in greater detail below.

The engine controller 150 utilizes the EPOS module 110 and various control laws to generate and/or process control instructions for the engine 130. The control laws can be executed by a control law module 150, which can be constructed as an individual hardware controller including memory that stores the control logic and executable algorithms. The EPOS module 110 and other modules or sub-controllers may be designed to monitor, control, or otherwise act in associative function with regards to the engine 130. The EPOS module 110 can also generate estimated engine response parameters ($Y_{est}$) of the engine 130 and synthesized engine sensor response parameters (Ycrtr), along with other non-measured signals to the control law module 115.

In at least one embodiment, a synthesized value of the engine actuator 124 can be generated. These estimated engine response parameters ($Y_{est}$) and synthesized sensor response parameters (Ycrtr) are not measured values obtained directly from hardware sensors, but are instead estimated values that are computed based on a subset of control demands from the operator interface 140 (e.g. aircraft environmental control system bleed demand), boundary condition sensing (Ubc) such as for example, ambient pressure and temperature, engine condition sensing (Ycrtr_t) such as pressure and temperature at high compressor inlet, and effecter sensing (Ufb) such as burner fuel flow and compressor variable vanes. The engine response estimated parameters ($Y_{est}$) include, but are not limited to, low compressor exit pressure and temperature, burner exit pressure and temperature, turbo machinery torques, and engine core and duct flows. The synthesized sensor signals (Ycrtr,) include, but are not limited to, low and high spool shaft rotating speeds, low turbine exit temperature and high compressor exit pressure and temperature. These various synthesized sensor signals (Ycrtr) are generated independently from the measured engine operating parameters (Ycrtr_t).

In at least one embodiment, the EPOS module 110 can selectively activate or deactivate a correcting mode. The correcting mode can be activated when the aircraft is operating according to normal operating conditions (e.g., when no faults are detected). In this scenario, Ycrtr_t is utilized which can improve the estimation of Yest. For example, when operating in the correcting mode, Ycrtr response signals track or follow Ycrtr_t. In this manner, the EPOS module 110 can zero out errors between Ycrtr and Ycrtr_t by applying shifts to EPOS component models (e.g., compressor efficiencies and flow capacities, bleed flow areas and duct pressure losses).

When, however, a fault is detected (e.g., an actuator fault, actuator sensor fault, etc.), the EPOS module 110 can deactivate the correcting mode so as to operate the engine 130 while disregarding Ycrtr_t. The EPOS module 110 can also deactivate the correcting mode to assist in confirming whether a fault exists. For example, the EPOS module 110 can deactivate the correcting mode, which in turn decouples Ycrtr from Ycrtr_t. Accordingly, Ycrtr can act as a reference value. That is, once decoupled, Ycrtr_t can be compared to Ycrtr. If Ycrtr_t deviates from Ycrtr, or the deviation exceeds a threshold value, a fault is determined to be present. The type of fault can then be identified and operations for accommodating the fault can be performed as described in greater detail below.

One or more of the modules in the engine controller 150 may obtain control feedback signals from an actuator sensor fault detection and accommodation (FDA) module 116 and control commands from the operator interface 140. The control law module 115 can also include includes a major loop and a minor loop. The major loop can generate control requests in engineering units to drive engine output (Y) to a desired or use-requested set point (Yset) by closing error between Yset and Yest. The minor loop may generate torque motor current request to move the actuator such as to drive error between corresponding engine effecter feedback (Ufb) and request (Urq) to zero.

Additionally, the engine controller 150 may process output and/or input data for the data's respective input/output destination. The input to the EPOS 110, provided by the engine controller 150, may be processed by FDA logic to detect range faults as well as in-range failures (e.g., rate-limit, cross-channel mismatch, etc.) and provide a reasonable input value along with a health status indication.

One or more hardware control components 120 may convert digital data generated by the engine controller 150 to analog signals that can control the engine 130, convert analog signal generated by the engine 130 into digital data readable by the engine controller 150, condition such input and output data for readability, and/or control actuators 124 associated with the engine 130. A digital-to-analog converter (not shown) can transform digital signals generated by the engine controller 150 into actuator request signals. The actuators 124 may include one or more devices which use control hardware to position various control components of the engine 130 in accordance with instructions generated by control law module 115.

The actuator sensors 125a and 125b are in signal communication with the actuator 124 via a respective channel. Multiple data channels are therefore employed with a given actuator 124 to provide sensor monitoring redundancy and improved robustness. The actuator sensors 125a and 125b are configured to measure various states of the actuators 124. The actuator states (or positions) may be related to the physical configuration of the various control components of an individual actuator 124 and/or the engine 130. In at least one embodiment, the actuator sensors 125a and 125b output one or more actuator measurement signals indicating a measured state of a respective actuator 124. For example, fluid-based systems often include actuators whose linear or angular positions are sensed by the actuator sensors 125a and 125b, and which are related to the physical position of control surfaces or other control devices located proximate to a compressor, combustor, turbine and/or nozzle/exhaust assembly.

The engine sensors 126a and 126b are in signal communication with the engine 130 via their respective channels. Multiple data channels are employed to provide sensor monitoring redundancy and improved robustness. Each engine sensor 126a and 126b may measure operational parameters associated with the engine 130. In at least one embodiment, the engine sensors 126a and 126b are configured to output an engine measurement signal indicating a measured state of the engine 130. For example, fluid-based systems may include engine sensors 126a and 126b that measure the working fluid pressure, temperature and fluid flow at various axial and radial locations in the flow path. The engine sensors 126a and 126b may comprise a variety of different sensing devices, including, but not limited to, temperature sensors, flow sensors, vibration sensors, debris sensors, current sensors, voltage sensors, level sensors, altitude sensors and/or blade tip sensors. The engine sensors 126a and 126b may be positioned to measure operational parameters related to the function of engine 130, e.g., parameters related to control commands submitted to EPOS 110 and control requests generated by the control law module 115 in order to direct the actuators 124 to control engine 130.

The engine sensors 126a and 126b and the actuator sensors 125a and 125b output electrical signals which size is a known function of the measurement. For example voltage or current of electrical signal produced by engine sensor may be proportional to gas temperature or pressure at the point in engine gas path where sensor is located. The electrical signals generated by the actuator sensors 125a and 125b are delivered to analog-to-digital converter 123a, and the electrical signals generated by the engine sensors 126a and 126b are delivered to analog-to-digital converter 123b. The analog-to-digital converters 123a and 123b may convert the electrical signals into digital signal data which may be compatible with and read by the modules or sub-controllers of the engine controller 150. Although two individual analog-to-digital converters 123a and 123b are shown, it should be appreciated that a single analog-to-digital converter can be implemented without deviating from the scope of the invention.

The engine 130 may be constructed as any fluid-based engineering system. Example fluid-based engineering systems may include gas turbine engines for aviation and power generation, HVAC&R (heating, ventilation, air-conditioning and refrigeration), fuel cells, and other, more generalized fluid processing systems for hydrocarbon extraction, materials processing, and manufacture. In various embodiments, the physical components of engine 130 include, but are not limited to, compressors, combustors, turbines, shafts, spools, fans, blowers, heat exchangers, burners, fuel cells, electric motors and generators, reactor vessels, storage vessels, fluid separators, pipes, ducts, valves, mixers and other fluid processing or flow control devices.

In some examples, the engine 130 may perform a thermodynamic cycle on a working fluid in order to generate rotational energy, electrical power or reactive trust, to provide heating, ventilation, air conditioning and refrigeration, or to perform other fluid processing functions. The range of available cycles includes, but is not limited to, the following cycles and their derivatives: Otto cycles, Diesel cycles, Brayton turbine (or first Ericsson) cycles, Brayton jet (Barber/Joule) cycles, Bell-Coleman (reverse Brayton) cycles, Ericsson (Second Ericsson) cycles, Lenoir (pulse-jet) cycles, and Carnot, Stoddard and Stirling cycles. Additionally or alternatively, engine 130 may perform a number of individual thermodynamic processes for heating, cooling, flow control, or for processing applications in agriculture, transportation, food and beverage production, pharmaceutical production, or manufacturing, or for the extraction, transportation or processing of a hydrocarbon fuel. The range of available thermodynamic processes includes, but is not limited to, adiabatic, isothermal, isobaric, isentropic, and isometric (isochoric or isovolumetric) transformations, exothermic reactions, endothermic reactions and phase changes.

In the present example, the engine 130 is a gas turbine engine. As such, the monitored aspects of the engine 130 may include, but are not limited to, a compressor, combustor, turbine and/or nozzle/exhaust assembly. The input and output values received/generated by the EPOS 110 may be vectors representing values for positions (i.e., nozzle areas, variable vane angles, flow path areas, etc.), states, and actual sensed values of parameters (i.e., spool speeds, gas path temperatures, pressures proximate to components, flow rates proximate to components, etc.) related to the components of a gas turbine engine (i.e., a compressor, combustor, turbine and/or nozzle/exhaust assembly, etc.).

As described above, the engine controller 150 can actively perform real time detection of the soft failures and/or hard failures described herein, in addition to accommodating or compensating for these soft failures and/or hard failures. In this manner, the engine controller 150 can maintain target operating conditions of the engine 130 in response to detecting soft failures and/or hard failures.

In at least one embodiment, the engine controller 150 is in signal communication with the actuator 124, the actuator sensors 125a and 125b, the engine sensors 126a and 126b, and the engine 130. The EPOS module 110 of the engine controller 150 is configured to synthesize the response of the engine 130, i.e. Yest corresponding to Y and Ycrtr corresponding to Ycrtr_t, based boundary condition sensing parameters (Ubc), engine sensing parameters (Ycrtr_t), and actuator sensing parameters (Ufb). In addition, the actuator FDA module 116 of the engine controller 150 is configured to synthesize vector of effecter positions (Ufb_syn) corresponding to the actuators 124. In this manner, the engine controller 150 can control the engine 130 based the synthesized actuator parameters and/or the synthesized engine operating parameter, when detecting the presence of a faulty actuator 124, one or more faulty actuator sensors 125a and 125b, and/or one or more faulty engine sensors 126a and 126b.

The engine controller 150 includes additional control modules, along with the EPOS module 110, which work together to perform the real time detection of the faulty hardware components 120, soft failures, and/or hard failures described herein. For example, the engine controller 150 includes, but is not limited to, an actuator sensor module 112, an engine sensor module 114, an actuator system FDA module 116, and an engine sensor FDA module 118. Any one of the actuator sensor module 112, the engine sensor module 114, the actuator system FDA module 116, and the engine sensor FDA module 118 can be constructed as an electronic hardware controller that includes memory and a processor configured to execute algorithms and computer-readable program instructions stored in the memory. The memory of each module 112-118 can also store individual models, thresholds, and target parameters which are utilized for executing respective control algorithms.

The actuator sensor module 112 is configured to process digital data received from analog-to-digital converter 123a, which is indicative of the measured parameters output by the actuator sensors 125a and 125b. The measured parameters are indicative of operating parameters associated with the actuator 124. The processed digital data includes, but is not limited to, data conversion, low level fault detection, and accommodation, along with linkage compensation.

The engine sensor module 114 is configured to process digital data received from analog-to-digital converter 123b, which is indicative of the measured parameters output by the engine sensors 126a and 126b. The measured parameters are indicative of operating parameters associated with the engine 130. The processed digital data includes, but is not limited to, data conversion, low level fault detection and accommodation (FDA), and signal domain transforms.

The actuator system FDA module 116 is in signal communication with the control law module 115. The actuator system FDA module 116 operates to detect a faulty actuator 124 and/or one or more faulty actuator sensors 125a and/or 125b. For example, the actuator system FDA module 116 is capable of distinguishing between an actuator sensor in-range fault (e.g. LVDT) and a failed actuator 124. The actuator system FDA module 116 is also capable of identifying the type of actuator sensor fault that exists. That is, the actuator system FDA module 116 can distinguish between a single-channel fault (i.e., a single actuator sensor is faulty), or a dual-channel fault (i.e., both actuator sensors 125a and 125b are faulty).

Based on the diagnosis (i.e., health) of the actuator 124 and/or the actuator sensors 125a and 125b, the actuator system FDA module 116 outputs a selected feedback signal indicating the best known response of the actuator 124. In absence of faults, the selected feedback signal (Ufb) is typically set to an average, minimum (min) or maximum (max) of the measurements from two channels (i.e. signals corresponding to sensor 125a and 125b). The $U_{FB}$ serves as a feedback signal indicative of various measured parameters including, but not limited to, Wf, HPCvv, and LPCvv. When one or more faulty actuator sensors 125a and 125b (i.e. dual channel failure) are detected, the $U_{FB}$ is replaced with $U_{FB\_SYN}$. In this manner, the control law module 115 may remain in control of the actuator 124 and thus achieving desired control target though at somewhat reduced performance despite a detected fault associated with the one or more of the actuator sensors 125a and 125b.

In at least one embodiment, the output of a faulty actuator sensor can be isolated with the $U_{FB\_SYN}$ signal when a single channel fault is detected. In this scenario, the actuator system FDA module 116 can isolate or disconnect the faulty actuator sensor (e.g., 125a). Thereafter, the measured output ($U_{FB\_}$) of the remaining actuator sensor (e.g., 125b) can still be utilized while the $U_{FB\_SYN}$ signal serves as guide.

In another example, the actuator system FDA module 116 may detect a dual channel failure (i.e., failure of both actuator sensors 125a and 125b). In this scenario, the actuator system FDA module 116 isolates or disconnects both failed actuator sensors 125a and 125b. Thereafter, the feedback signal indicating measured output (i.e., $U_{FB}$) normally set to an average, min or max of the two channels (i.e. signals from actuator sensors 125a and 125b) is substituted with synthesized feedback signal (i.e., $U_{FB\_SYN}$) such that reasonable actuator feedback is available to the EPOS module 110 and control law module 115. Thereafter, the control system 100 can also invoke a "safe mode" mode which serves to operate the engine 130 at basic operating conditions (e.g., low or minimum speed, minimum thrust, minimum load, etc.) so that the aircraft can be brought to a desired location for inspection.

The engine sensor FDA module 118 is in signal communication with the engine sensor module 114, control law module 115, and the EPOS module 110. The engine sensor FDA module 118 is configured to detect in-range fault conditions of the engine sensors 126a and 126b, single engine channel failures (i.e., a fault with a single engine sensor 126a or 126b), and/or dual engine channel failures (i.e., a fault with both engine sensors 126a and 126b).

The engine sensor FDA module 118 outputs a selected feedback signal based on the diagnosis (i.e., health) of the engine sensors 126a and/or 126b. In absence of faults, typically the selected measured feedback signal (Ycrtr_t) is set to an average, low or max of the two channels (i.e. signals from engine sensors 126a and 126b). The engine sensor FDA module 118 also receives synthesized engine feedback signal (Ycrtr) generated by the EPOS module 110. When a dual engine channel failure is detected (i.e. both engine sensors 126a and 126b are faulty) selected feedback is set to Ycrtr as described in greater detail below. In either scenario, the selected feedback signal (i.e., Ycrtr_t or Ycrtr) is delivered to the EPOS module 110 and the control law module 115.

The measured engine parameters include, but are not limited to, pressure (P), temperature (T), flow (W) at various locations in engine gas path and shaft speed (N). The synthesized engine feedback signal (Ycrtr) provides an estimation or calculation of the engine parameters mentioned above. When one or more faulty engine sensors 126a and 126b (i.e. dual channel in-range failure) are detected, the measured engine feedback signal (Ycrtr_t) output from the engine sensor FDA module 118 is replaced with the synthesized engine feedback signal (Ycrtr). In this manner, the control law module 115 and/or the EPOS module 110 may still obtain an accurate estimation of the engine's operating status despite a detected fault associated with the one or more of the engine sensors 126a and 126b.

In at least one embodiment, the measured engine response (Ycrtr_t) is set to 'healthy' channel when a fault has been isolated in one of the channels. For example, when am in-range failure is isolated in channel corresponding to an engine sensor 126a, the measured engine response (Ycrtr_t) is set to healthy channel corresponding to engine sensor 126b. In this manner, the engine sensor FDA module 118 can effectively isolate or disconnect the faulty engine sensor (e.g., 126a). Thereafter, the measured engine response (Ycrtr_t) of the remaining engine sensor (e.g., 126b) can still be utilized while the synthesized engine response (Ycrtr) serves as guide.

In another embodiment, the measured engine response (Ycrtr_t) can be replaced with the synthesized engine response (Ycrtr) when a dual channel fault is detected, i.e. an in-range failure is detected in both sensor 126a and 126b. For example, the EPOS module 110 can operate to synthesize the response of the engine 130. In this manner, the synthesized engine response signal (Ycrtr) can also be utilized to determine a particular type of failure associated with the engine sensors 126a and/or 126b. The EPOS module 110 can also generate the synthesized engine feedback signal ($Y_{CRTR}$) to synthesize the feedback response of the engine sensors 126a and 126b when an engine sensor fault is detected. The synthesized engine feedback signal ($Y_{CRTR}$) can then be compared to the measured engine response signal ($Y_{CRTR\_T}$) to detect a dual engine channel failure associated with the engine sensors 126a and 126b.

In another example, the engine sensor FDA module 118 may detect a dual engine channel failure (i.e., failure of both engine sensors 126a and 126b). In this scenario, the engine sensor FDA module 118 isolates or disconnects both failed engine sensors 126a and 126b. Thereafter, the feedback signals indicating measured outputs (i.e., $Y_{CRTR\_T}$) are substituted with the synthesized feedback signal (i.e., $Y_{CRTR}$) generated by the EPOS module 110 such that engine response monitoring can be maintained. Thereafter, the control system 100 can also invoke a "limp home" mode which serves to operate the engine 130 at basic, or minimum, operating conditions (e.g., low or minimum speed, minimum thrust, minimum load, etc.) so that the aircraft can be brought to a desired location for inspection.

In addition to synthesizing the engine response ($Y_{CRTR}$) of the engine 130, the EPOS module 110 can also synthesize an expected response band i.e. maximum and minimum values that bound each sensed engine parameter. These limits are synthesized as a function of one or more sensed parameters. The sensed parameters include, but are not limited to, Ubc, Ufb, Urq, along with other sensed parameters excluded from the estimated parameters such as, for example, Wf, HPCvv, LPCvv, etc. The synthesized band can be utilized to detect when the outputs of one or more engine sensors 126a and 126b drift from expected operating ranges.

Figure 2A:
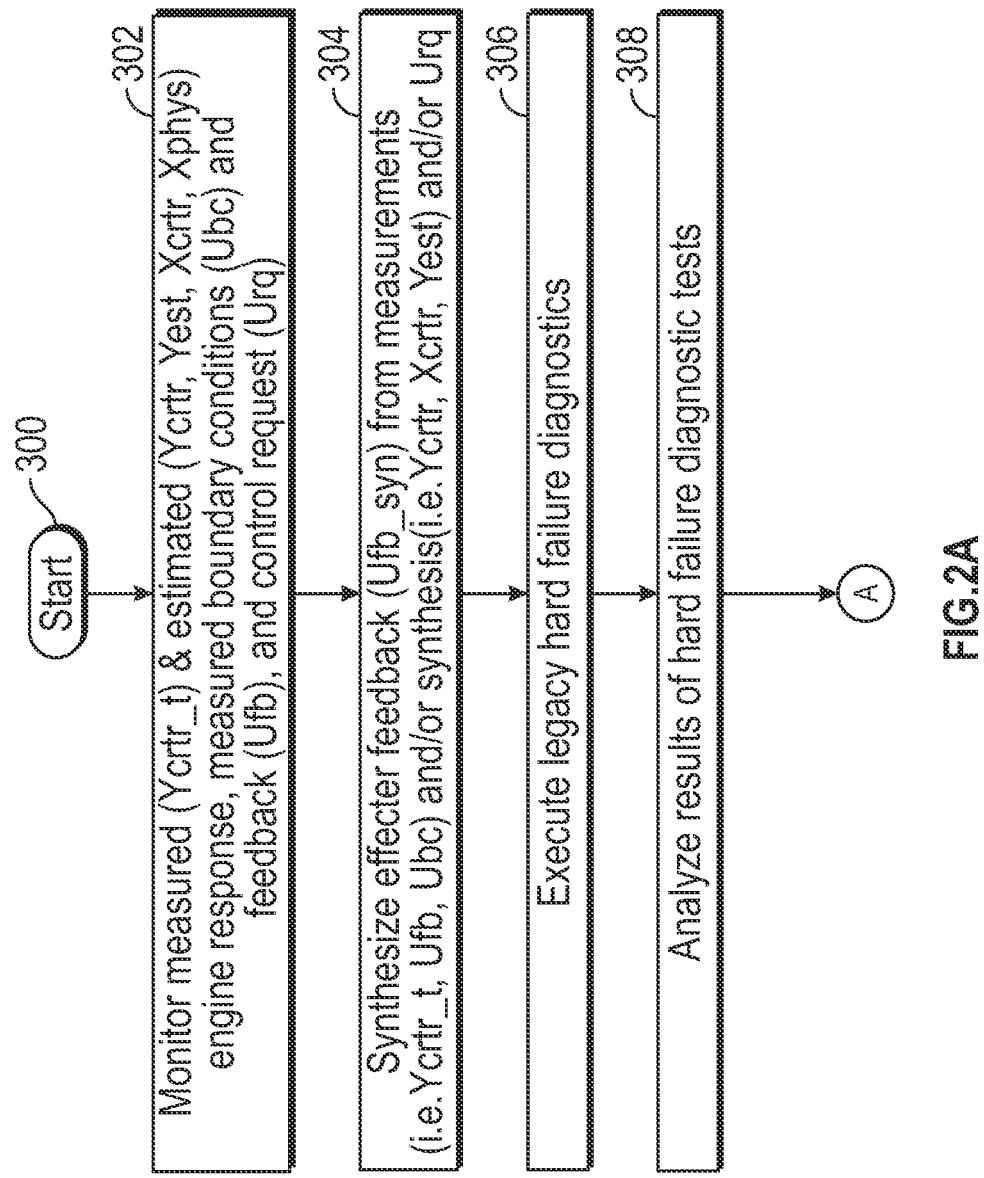
FIGS. 2A and 2B depict a flow diagram illustrating a method of detecting and accommodating an actuator hardware fault and/or actuator sensor fault according to a non-limiting embodiment.
Figure 2B:
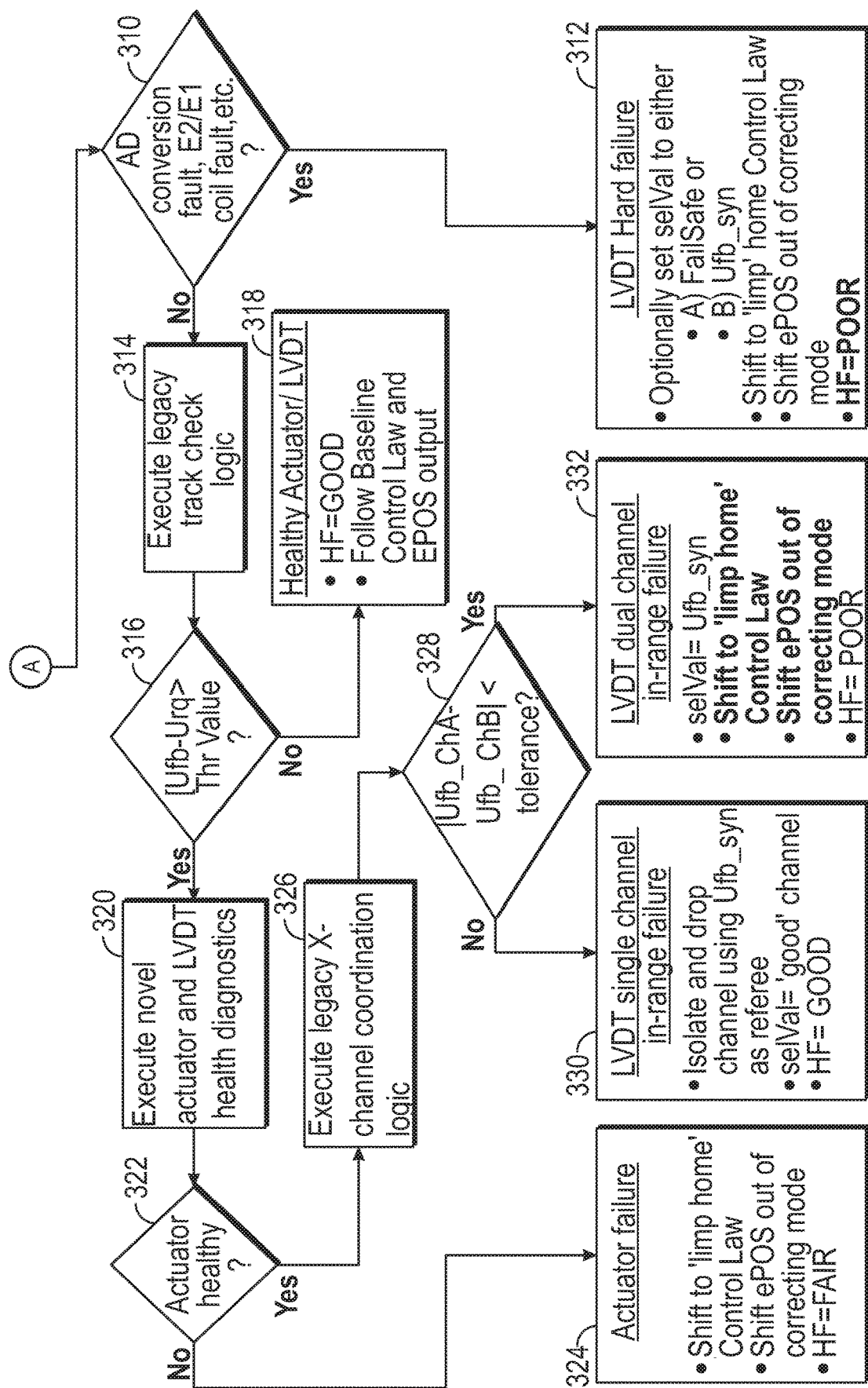

Turning now to FIGS. 2A and 2B, a flow diagram illustrates a method of detecting and accommodating a faulty actuator 124, a LVDT single channel in-range failure, a LVDT dual channel in-range failure, and a LVDT hard failure. The method begins at operation 300, and at operation 302 various system parameters are obtained. The system parameters include measured engine response parameters (e.g., Ycrtr_t), estimated engine response parameters (e.g., Ycrtr, Xcrtr, $Y_{est}$), measured boundary conditions (Ubc), measured effecter parameters (Ufb), and control request parameters (Urq). Ycrtr is an example of a synthesized engine operating parameter. Xcrtr is an example of a corrector error parameter.

At operation 304, synthesized effecter parameters ($U_{FB\_SYN}$) associated with the operation of the actuator 124 are generated. At operation 306, a hard failure diagnostic test is performed, and the results of the hard failure diagnostic test are analyzed at operation 308 to determine whether a hard failure is present in the system. In at least one embodiment, the hard failure diagnostic test can indicate presence of an analog-to-digital conversation fault, an E2/E1 coil fault, or other types of hard failures. When a hard failure is detected at operation 310, various hard failure accommodation operations are executed at operation 312. The hard failure accommodation operations include, but are not limited to, optionally setting an effecter selected value to a known failsafe position of the actuator or a synthesized effecter position (i.e., utilizing the $U_{FB\_SYN}$ signal as opposed to the measured $U_{FB}$ signal), invoking a "safe" control law mode, deactivating the correcting mode, and setting a health software flag (HF) as poor. The "safe" control law mode serves to operate the engine 130 at basic operating conditions (e.g., low or minimum speed, minimum thrust, minimum load, etc.) so that the aircraft can be brought to a desire location for inspection.

When, however, the fault is not a hard failure at operation 310, the method proceeds to operation 314 to perform a track check diagnostics. The track check diagnostics aim to compare the measured actuator feedback signal (Ufb) with an actuator request signal (Urq). When there is a deviation between the measured signal and the request signal (e.g., [$U_{FB}$–Urq]), or when the deviation exceeds a threshold value (e.g., [$U_{FB}$–Urq]>Thr) at operation 316, a track check failure is detected. When a track check failure is not detected, the actuator 124 and actuator sensors 125a and 125b are determined as being healthy and operating according to nominal control operations at operation 318. Accordingly, the HF is set to "good", and the system can operate according to baseline control operations of the EPOS module 110 and the control law module 115.

When, however, the track check diagnostics fails at operation 316, the method proceeds to operation 320, where an actuator and LVDT health diagnostics is executed. When the actuator 124 is deemed faulty (i.e., not healthy) at operation 322, actuator fault accommodation operations are performed at operation 324. The actuator fault accommodation operations include, for example, invoking a "safe" control law mode, deactivating the correcting mode (i.e., shift the EPOS module 110 out of the correcting mode,) and setting the HF as "fair".

When the actuator 124 is deemed healthy at operation 322, the method proceeds to operation 326, and executes a cross-channel diagnostics. When the channel-to-channel difference exceeds predefined tolerance as checked at operation 328 (e.g., Ufb_ChA–Ufb_ChB>$Thr_{XC}$), an LVDT single channel in-range failure is detected and appropriate accommodation is performed at operation 330. The single channel in-range failure accommodation operations include, but are not limited to, isolating or disconnecting the faulty channel using the synthesized effecter value (Ufb_syn) as referee. The selected value of the effecter parameter is then set to healthy and HF is set to "good".

When, however, the cross-channel diagnostics determines that difference between two channels exceeds given threshold at operation 328 (e.g., Ufb_ChA–Ufb_ChB≤$Thr_{XC}$), an LVDT dual channel in-range failure is detected and accommodation is performed at operation 332. The dual channel in-range failure accommodation operations include replacing output of the measured actuator response signal (Ufb) associated with each actuator sensor 125a and 125b with the synthesized actuator response signal ($U_{FB\_SYN}$), invoking a "safe" control mode, deactivating the correcting mode of the EPOS module 110, and setting the HF as "poor".

Figure 3A:
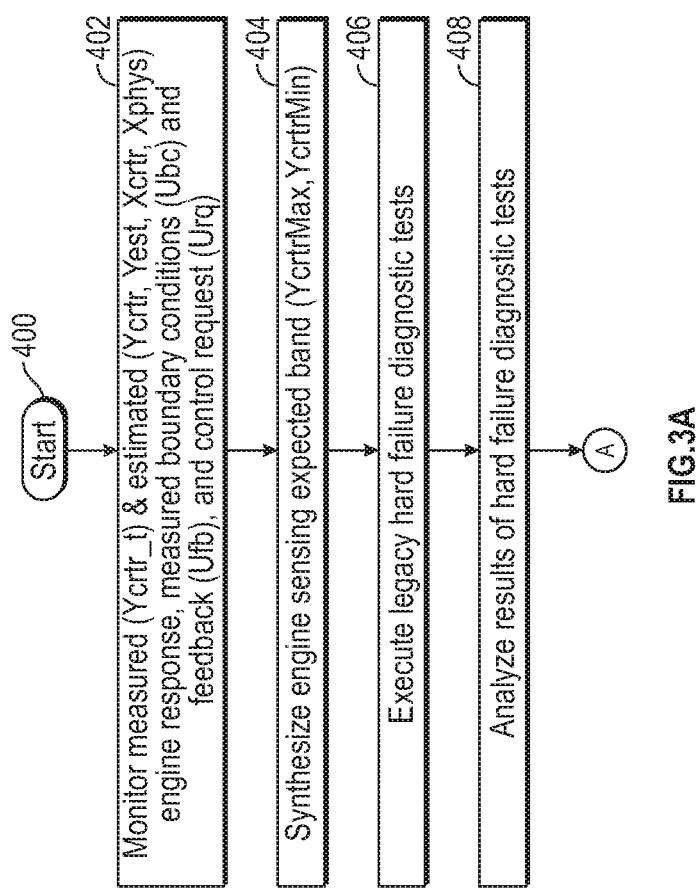
FIGS. 3A and 3B depict a flow diagram illustrating a method of detecting and accommodating an engine sensor fault according to a non-limiting embodiment.
Figure 3B:
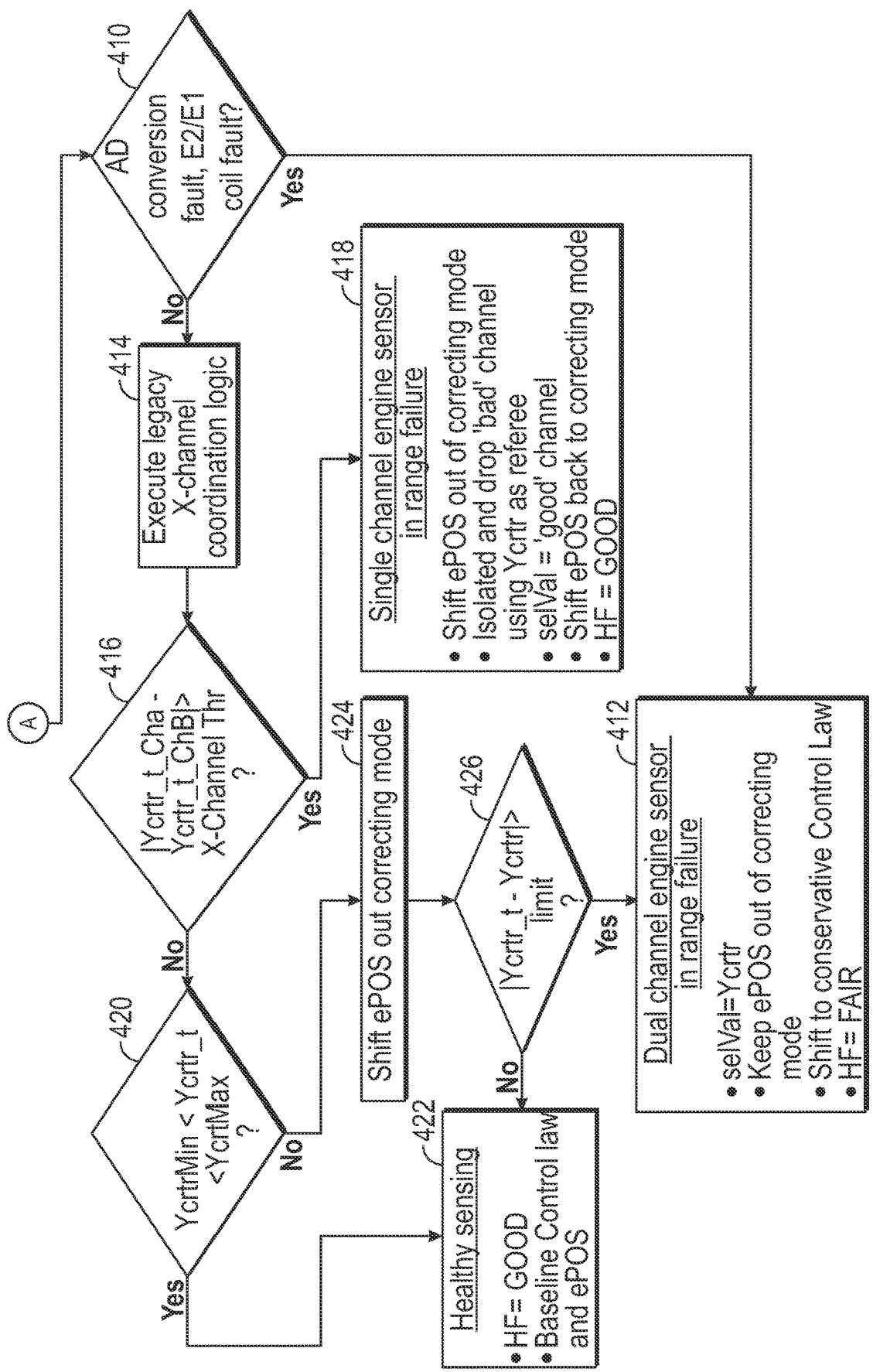

Referring now to FIGS. 3A-3B, a flow diagram illustrates a method of detecting and accommodating for a faulty engine sensor 126a and/or 126b according to a non-limiting embodiment. The method begins at operation 400, and at operation 402 various system parameters are obtained. The system parameters include measured engine response parameters (e.g., Ycrtr_t), estimated engine response parameters (e.g., Ycrtr, Xcrtr, $Y_{est}$), measured boundary conditions (Ubc), measured effecter parameters ($U_{FB}$), and control request parameters (Urq).

At operation 404, synthesized or estimated engine sensing expected band limits (e.g., $Ycrtr_{Max}$, $Ycrtr_{Min}$) are generated. In at least one embodiment, the engine sensing expected band is based on measurements not used by the EPOS module 110 such as Ubc, Ufb, and subset of Ycrtr_t and/or control request Urq. At operation 406, a hard failure diagnostic test is performed, and the results of the hard failure diagnostic test are analyzed at operation 408 to determine whether a hard failure is present in the system. In at least one embodiment, the hard failure diagnostic test can indicate presence of an analog-to-digital conversation fault, an E2/E1 coil fault, or other types of hard failures. When a hard failure is detected at operation 410, the accommodation is identical to the one of a dual channel engine sensor in-range failure at operation 412. The dual channel engine sensor in-range failure accommodation operations include, but are not limited to, replacing the measured engine response signal with a synthesized engine response signal ($Y_{CRTR}$), deactivating the correcting mode of the EPOS module 110, setting the HF as "fair", and invoking a "safe" control law mode. As described in detail above, the "safe" control law mode serves to operate the engine 130 at basic operating conditions (e.g., low or minimum speed, minimum thrust, minimum load, etc.) so that the aircraft can be brought to a desire location for inspection.

When, however, a hard failure is not detected at operation 410, an engine sensor cross-channel diagnostic is performed at operation 414. In at least one embodiment, the engine sensor cross-channel diagnostic may include comparing the measured engine response ($Y_{CRTR\_T\_CHa}$) output from a first engine sensor (e.g., 126a) with the measured engine response output ($Y_{CRTR\_T\_CHb}$) from a second engine sensor (e.g., 126b). In normal operating conditions $Y_{CRTR\_T\_CHa}$, should match $Y_{CRTR\_T\_CHb}$. Therefore, differences or deviations between $Y_{CRTR\_T\_CHa}$, and $Y_{CRTR\_T\_CHb}$ can indicate the presence of a possible engine sensor in-range failure.

For example, when the engine sensor cross-channel diagnostic indicates a failure (e.g., [$Y_{CRTR\_T\_CHa}$−$Y_{CRTR\_T\_CHb}$]>$Thr_{EXC}$) at operation 416, the method determines the presence of a single channel engine sensor in-range failure, and performs a variety of single channel engine sensor in-range failure accommodation operations at operation 418. The single channel engine sensor in-range failure accommodation operations include, but are not limited to, deactivating the correcting mode of the EPOS module 110, isolating or disconnecting the faulty channel (i.e., the faulty engine sensor) using estimated engine response (Ycrtr) as referee, setting selected value of engine response (Ycrtr_t) to exclusively the normal operating channel (i.e., normal operating engine sensor), and setting the HF as "good" and optionally shifting the EPOS module 110 back into correcting mode.

When, however, the engine sensor cross-channel diagnostics does not indicate a failure (e.g., [Ycrtr_t_ChA−Ycrtr_T_ChB]≤$Thr_{EXC}$) at operation 416, the method determines whether the engine sensor 126a and/or 126b is healthy or whether a dual channel engine sensor in-range failure exists. For example, at operation 420 the measured engine response (Ycrtr_t) is compared to an expected band or sensing tolerance range (YcrtrMin, YcrtrMax). When Ycrtr_t is within the expected band (e.g., YcrtrMin<Ycrtr_t<YcrtrMax), the engine sensors 126a and 126b are deemed healthy at operation 422. Accordingly, the HF is set to "good", and the measured engine response parameters ($Y_{CRTR\_T}$) is set based on for example an average, max or min of the two channels, i.e. signals from the engine sensors 126a and 126b. Appropriately, the operations of the baseline control law module 115 and the EPOS module 110 operations are performed.

When, however, $Y_{CRTR\_T}$ falls outside the expected band at operation 420, the correcting mode of the EPOS module 110 is deactivated at operation 424, and then using synthesized engine response parameters ($Y_{CRTR}$) as a referee at operation 426, a differential between Ycrtr_t and Ycrtr is compared to a differential threshold value (i.e. limit) at operation 426. When the differential between Ycrtr_t and Ycrtr is below the differential threshold value, both channels (i.e. signals corresponding to the engines sensors 126a and 126b) are deemed healthy at operation 422.

When, however, the differential between Ycrtr_t and Ycrtr exceeds the differential threshold value at operation 426, a dual channel engine sensor in-range failure is determined at operation 412, and various dual channel engine sensor in-range failure accommodation operations are performed. The failure accommodation operations include, but are not limited to, replacing the measured engine response signals output (Ycrtr_t) with the synthesized engine response parameters (Ycrtr), maintaining deactivation of the correcting mode, invoking a "safe" control law mode, and setting the HF as "fair".

Figure 4A:
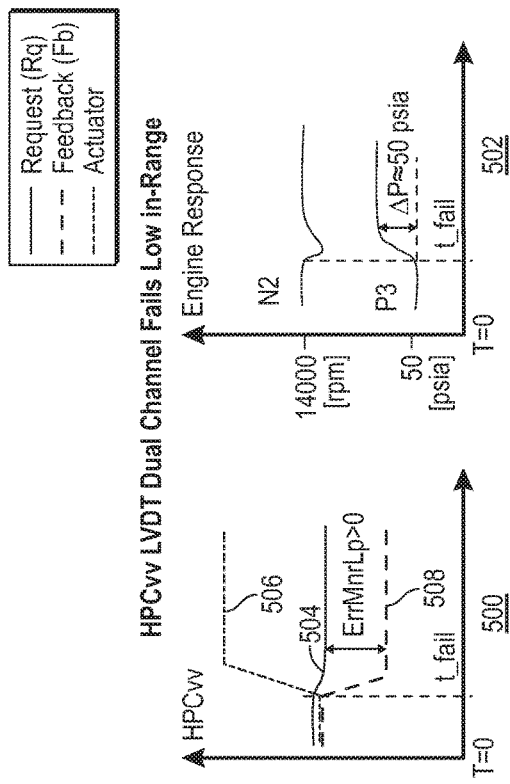
FIGS. 4A and 4B are signal diagrams depicting detection strategies for detecting in-range sensor failures according to non-limiting embodiments.
Figure 4B:
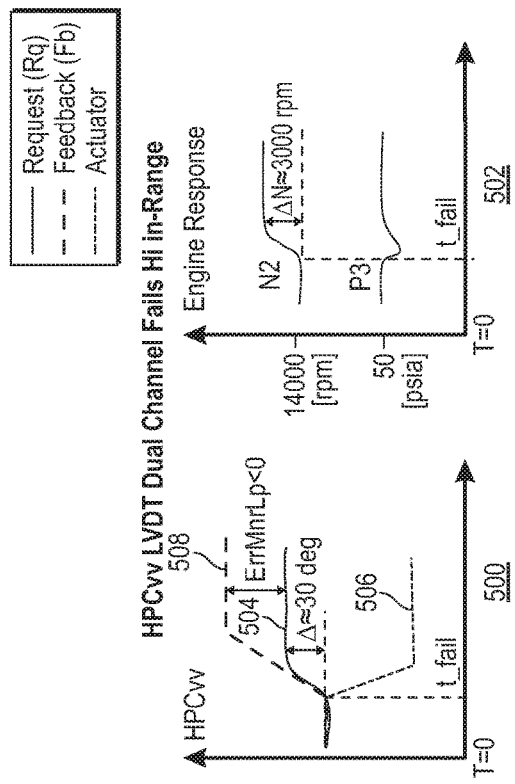

With reference now to FIGS. 4A and 4B, detection strategies for determining in-range sensor failures are illustrated according to non-limiting embodiments. FIG. 4A illustrates an example of detecting a failed actuator sensor, e.g., a HPCvv LVDT Low in-range dual channel failure. The left side (500) of the diagram illustrates a requested control signal 504 for operating the actuator 124, with respect to a signal 506 representing the actual response of the actuator 124, and a feedback actuator response signal 508 indicating a measured response of the actuator 124 set based on output by the actuator sensors 125a and 125b (i.e. channel A and channel B sensor signals). In absence of faults, the measured response can be set to an average, max or min of the two channels. In at least one embodiment, the actual actuator response signal 506 can be synthesized based on the measured engine parameters and the requested control signal 504. The right side (502) of the diagram illustrates a measured engine response (e.g., measured speed and measured pressure) during such failure.

As illustrated at the left side (500), the feedback actuator response signal 508 drifts below the requested control signal 504 producing a positive minor loop control law error (i.e., ErrMnrLP=difference between the requested control signal 504 and the feedback actuator response signal 508) that falls outside the expected tolerance triggering track check failure. In addition, the system response to the failure can be characterized by the following: (a) the measured pressure (P3) drifts from an expected pressure value that should be achieved according to the requested control signal 504, (b) the rate of change in measured pressure (P3) is positive while the rate of change in measured compressor rotational speed (N2) is negative immediately after the failure, (c) the rate of change of control request 504 is negative immediately after the failure and (d) the feedback actuator signal deviates from the synthesized value (not shown on the FIG. 4A) by predetermined margin. Any of the above indicators or combination thereof can be executed by the actuator system FDA module 116 to determine the presence of an HPCvv LVDT Low in-range dual channel failure.

FIG. 4B illustrates another scenario of detecting a failed actuator sensor, e.g., an HPCvv LVDT Hi in-range dual channel failure. In this scenario, the feedback actuator response signal 508 drifts above the requested control signal 504 producing negative minor loop control law error (i.e., ErrMnrLP=difference between the requested control signal 504 and the feedback actuator response signal 508) that falls outside the expected tolerance triggering track check failure. In addition, the system response to the failure can be characterized by the following: (a) the measured speed (N2) drifts from an expected speed value that should be achieved according to the requested control signal 504, (b) the rate of change in measured pressure (P3) is negative while the rate of change in measured compressor rotational speed (N2) is positive immediately following the failure, (c) rate of change of control request 504 is positive immediately after the failure and (d) the feedback actuator signal deviates from the synthesized value (not shown on FIG. 4B) by predetermined margin. Any of the above indicators or combination thereof can be used in the actuator system FDA module 116 to determine the presence of an HPCvv LVDT Hi in-range dual channel failure.

Turning to FIGS. 5A and 5B, detection strategies for determining operating faults of an actuator 124 are illustrated according to non-limiting embodiments. FIG. 5A illustrates an example of a fault where an actuator 124 drifts to and stays at fully open position (i.e. fails open). The left side (500) of the diagram illustrates a requested control signal 504 for operating the actuator 124, with respect to an actual actuator response signal 506 of the actuator 124, and a feedback actuator response signal 508 indicating a measured response of the actuator 124 based on the output of the actuator sensors 125a and 125b (i.e. channel A and channel B sensor signals). In absence of faults, the measured response can be set to an average, max or min of the two channels. In at least one embodiment, the actual actuator response signal 506 can be synthesized based on the measured engine parameters and the requested control signal 504. The right side (502) of the diagram illustrates a measured engine response (e.g., measured speed and measured pressure) during such failure.

As illustrated at the left side (500), the feedback actuator response signal 508 drifts above the requested control signal 504 producing a positive minor loop control law error (i.e., ErrMnrLP=difference between the requested control signal 504 and the feedback actuator response signal 508) that falls outside the expected tolerance triggering track check failure. In addition, the system response to the failure can be characterized by the following: (a) the measured pressure (P3) drifts from an expected pressure value that should be achieved according to the requested control signal 504 and the feedback actuator response signal 508, (b) the rate of change in measured pressure (P3) is positive while the rate of change in measured compressor rotational speed (N2) is negative immediately after the failure, (c) the rate of change of control request 504 is negative immediately after the failure, and (d) the feedback actuator signal does not deviate from the synthesized value (not shown on the FIG. 4A) by predetermined margin. Any of the above indicators or combination thereof can be executed by the actuator system FDA module 116 to determine that the actuator 124 failed by drifting to staying at open position.

FIG. 5B illustrates another scenario of detecting a faulty actuator 124, when the actuator 124 drifts to and stays at closed position. In this scenario, the feedback actuator response signal 508 tracks the actual actuator response signal 506 drifting below the requested control signal 504 producing a negative minor loop control law error (i.e., ErrMnrLP=difference between the requested control signal 504 and feedback actuator response signal 508) that falls outside the expected tolerance triggering track check failure. In addition, the system response to the failure can be characterized by the following: (a) the measured speed (N2) drifts from an expected speed value that should be achieved according to the requested control signal 504 and the feedback actuator response signal 508, (b) the rate of change in measured pressure (P3) is negative while the rate of change in measured compressor rotational speed (N2) is positive immediately after the failure, (c) the rate of change of control request 504 is positive immediately after the failure, and (d) the feedback actuator signal does not deviate from the synthesized value (not shown on the FIG. 4A) by predetermined margin. Any of the above indicators or combination thereof can be used in the actuator and actuator sensor FDA module 116 to determine that the actuator 124 failed closed.

The actuator sensor faults and the actuator hardware fault both experience an inability of the minor loop of the control law module 115 to keep an error between the feedback actuator response signal 508 and the requested control signal 504 within required tolerance, thus failing to pass legacy track check diagnostics. However, the engine response during an actuator sensor failure (e.g. LVDT high or low in-range drifts) is very different and distinguishable from the engine response during an actuator hardware failure (e.g., actuator failed open or closed conditions). For example, when the measured engine response pressure differential ($\Delta P$) is detected during an actuator sensor failure (e.g., HPCvv LVDT Low in-range dual channel failure), the feedback actuator response signal 508 drifts below the requested control signal 504 (see FIG. 4A). When, however, the measured engine response pressure differential ($\Delta P$) is detected during an actuator hardware failure (e.g., actuator 124 fails open), the feedback actuator response signal 508 drifts above the requested control signal 504 and tracks the actual actuator response signal 506 (see FIG. 5A).

Similarly, when the measured engine response speed differential ($\Delta N$) is detected during an actuator sensor failure (e.g., HPCvv LVDT Hi in-range dual channel failure), the feedback actuator response signal 508 drifts above the requested control signal 504 (see FIG. 4B). When, however, the measured engine response pressure differential ($\Delta N$) is detected during an actuator failure (e.g., actuator 124 fails closed), the feedback actuator response signal 508 tracks the actual actuator response signal 506 below the requested control signal 504 (see FIG. 5B). In this manner, the actuator system FDA module 116 can distinguish a hardware failure of the actuator 124 (failed open or closed) from a failure of the actuator sensors 125a and 125b (e.g., a HPCvv LVDT Low in-range failure/HPCvv LVDT Hi in-range failure).

Figure 6A:
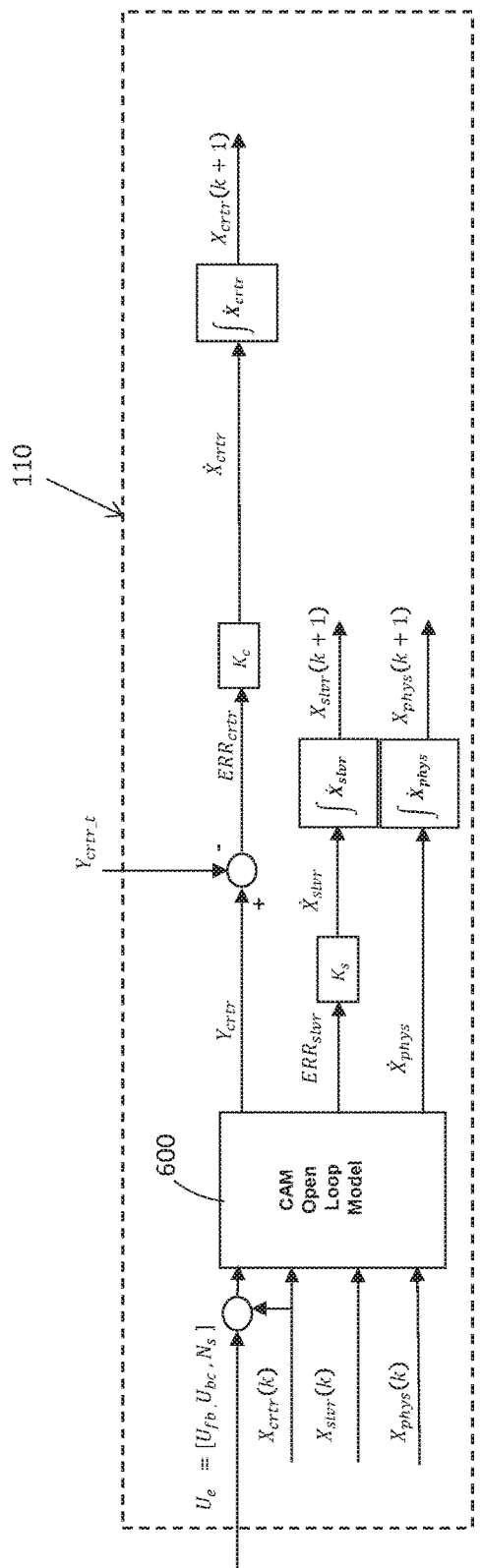
FIGS. 6A, 6B, 6C, 6D and 6E are schematic control operation diagrams illustrating alternative methods for detecting drift of an engine condition sensor according to non-limiting embodiments.
Figure 6B:
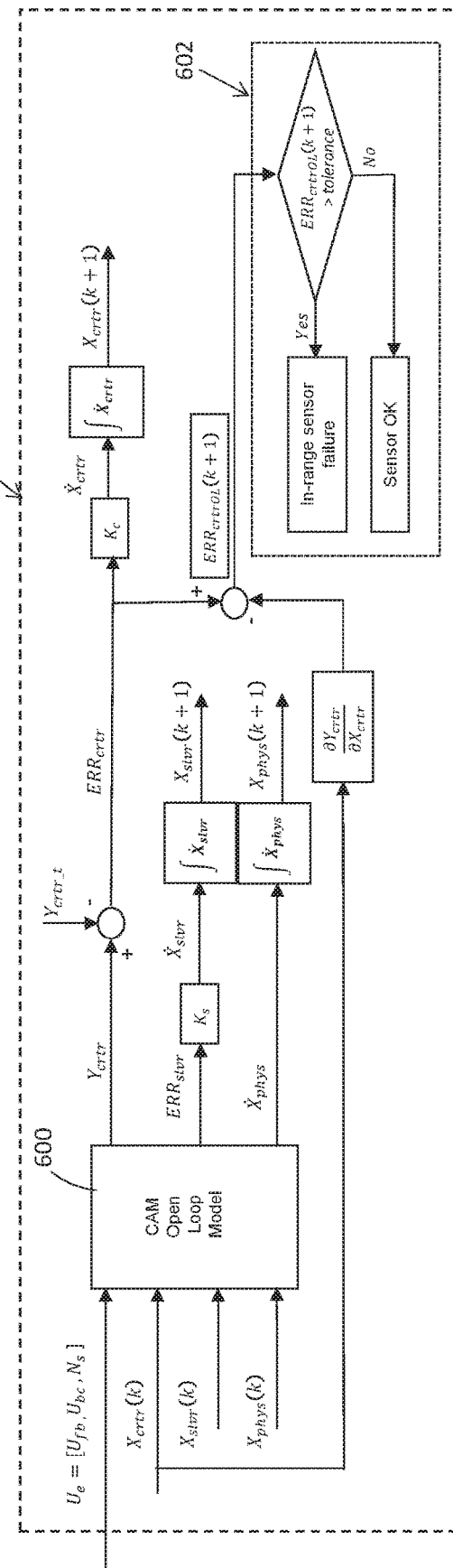
Figure 6C:
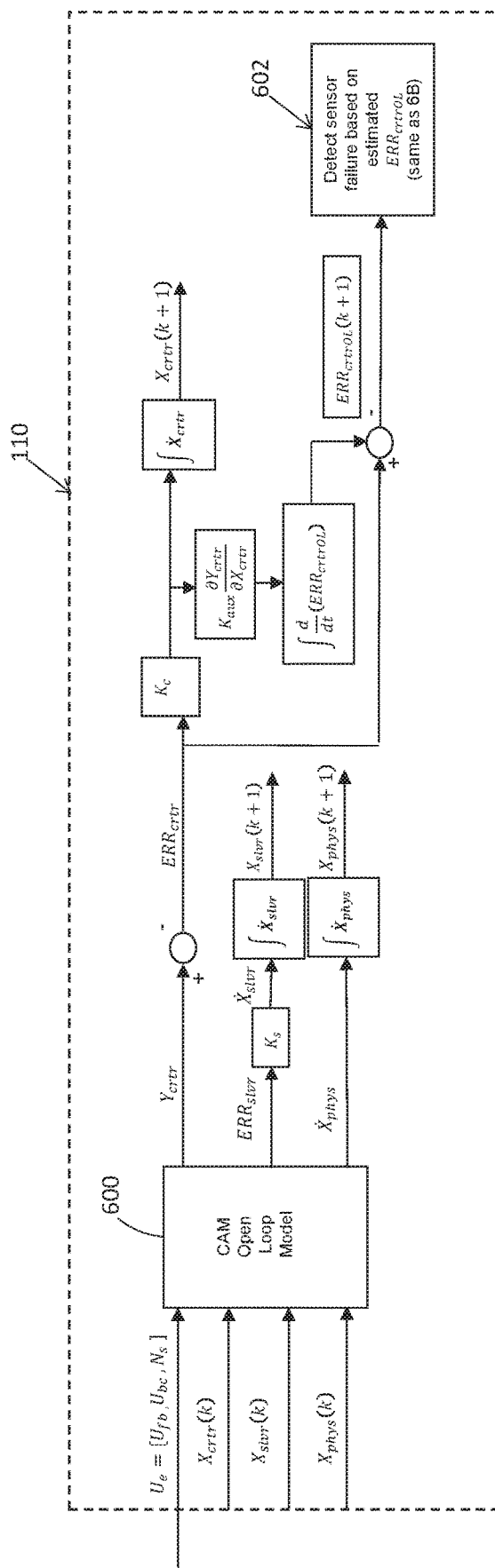

FIGS. 6A, 6B, and 6C illustrate various control operations of the EPOS module 110 capable of performing alternative methods for detecting drift in engine condition sensing. Although, engine condition sensing is described as an example, the techniques described in FIGS. 6A-6C can also be applied to detect actuator sensing drifts.

Turning to FIG. 6A, a schematic diagram illustrates operation of an EPOS module 110 according to a non-limiting embodiment. The EPOS module 110 general contains an open loop model (OLM) 600 and state estimator elements operating on outputs of the open loop model to estimate the EPOS dynamic states. An example of EPOS, a compact aero-thermodynamic mode (CAM) OLM 600 contains physics based mathematical abstraction of the controlled system components communicating according to governing physical laws as discussed herein is further detail in U.S. Patent Application Publication No. 20160003165 ("Compact aero-thermo model based control system"), which is hereby incorporated by reference in its entirety.

In one or more non-limiting embodiments, the OLM 600 receives external input vector (Ue) that may include Ufb, Ubc, selected engine condition sensing (e.g. shaft speed N). The OLM 600 may also receive dynamic states such as, for example, corrector states (Xcrtr), solver states (Xslvr) and physics states (Xphys). The OLM 600 calculates Ycrtr, a solver state error value (errSlvr) and physics state derivatives (XphysDot). The EPOS module 110 can also include an estimator that is in signal communication with the OLM 600, and operates on the corrector error value (ERRcrtr=Ycrtr−Ycrtr_t), errSlvr and XphysDot to estimate dynamic states, i.e. Xcrtr, Xslvr and Xphys. The operations may include calculation of state derivatives by applying appropriately defined gains such as Kc and Ks to errors such as ERRcrtr and errSlvr followed by numerical integration of state derivatives such as forward rectangular rule. As described earlier, if Ycrtr_t were to drift, the estimator can perform a corrector sate estimation that will estimate Xcrtr, which will drive Ycrtr towards Ycrtr_t and could therefore corrupt the Ycrtr and Yest parameters generated by the EPOS module 110.

At least one embodiment described herein includes an auxiliary calculation estimating error correction parameter that would have occurred, had correcting operating mode been disabled without having to actually disable the correcting mode. Such auxiliary calculation estimating error correction parameter is referred to as an open loop corrector error (ERRcrtrOL). A detection algorithm 602 can be executed (e.g., via the EPOS 110), which will operate on ERRcrtrOL to determine the engine condition sensor in-range failure based on any or all of the following: magnitude of ERRcrtrOL, rate of change of ERRcrtrOL, and time integral of ERRcrtrOL, and ERRcrtrOL/Xcrtr ratio.

One approach for estimating ERRcrtrOL is to assume that effects of Xslvr and Xphys on Ycrtr are negligible for the purposes of detecting engine condition sensor failure. With such an assumption in mind, an ERRcrtrOL estimation equation can be derived by linearizing the OLM about an operating point. The derivation is described below.

In one example, it is assumed that: (1) the solver state's effect (Xslver) on $Y_{crtr}$ is negligible for the purposes of detecting engine condition sensor failure, and (2) the physics states' effect (Xphys) on $Y_{crtr}$ is negligible for the purposes of detecting engine condition sensor failure.

With reference to FIG. 6A, linearization of the open loop model with corrector state estimator is described according to the following equations:

$$dY_{crtr} = \frac{\partial Y_{crtr}}{\partial U_e} dU_e + \frac{\partial Y_{crtr}}{\partial X_{crtr}} dX_{crtr} + \frac{\partial Y_{crtr}}{\partial X_{slvr}} dX_{slvr} + \frac{\partial Y_{crtr}}{\partial X_{phys}} dX_{phys} \quad (1)$$

A similar derivation can be obtained with corrector state estimator disabled:

$$dY_{crtrD} = \frac{\partial Y_{crtr}}{\partial U_e} dU_e + \frac{\partial Y_{crtr}}{\partial X_{crtr}} dX_{crtr} + \frac{\partial Y_{crtr}}{\partial X_{slvr}} dX_{slvr} + \frac{\partial Y_{crtr}}{\partial X_{phys}} dX_{phys} \quad (2)$$

For the purposes of sensor drift detection, the 'open loop' corrector error ($dERR_{crtrOL}$) is defined as a difference between the synthesized value of engine condition sensor with Xcrtr estimator disabled and the measured value. Accordingly, $dERR_{crtrOL}$ can be represented as:

$$dERR_{crtrOL} = dY_{crtrD} - dY_{crtr\_t} \quad (3)$$

The corrector error can be defined as:

$$dERR_{crtr} = dY_{crtr} - dY_{crtr\_t} \quad (4)$$

Computing $dY_{crtr\_t}$ from Eq. 4 and incorporating it into Eq. 3 provides the expression for the open loop corrector error (ERRcrtrOL) in terms of corrector error (ERRcrtr):

$$dERR_{crtrOL} = dY_{crtrD} - dY_{crtr} + dERR_{crtr} \quad (5)$$

In Eq. 5 above, $dY_{crtrD} - dY_{crtr}$ is obtained by subtracting Eq. (1) from Eq. (2) providing the following expression:

$$dY_{crtrD} - dY_{crtr} = -\frac{\partial Y_{crtr}}{\partial X_{crtr}} dX_{crtr} \quad (6)$$

Substituting Eq. (6) into Eq. (5) and re-arranging results in an expression for the open loop corrector error in terms of the corrector error and $dX_{crtr}$, expressed as:

$$dERR_{crtrOL} = dERR_{crtr} - \frac{\partial Y_{crtr}}{\partial X_{crtr}} dX_{crtr} \quad (7)$$

In at least one embodiment, $ERR_{crtr}$ can be assumed to be zero at steady state conditions. Accordingly, Eq. 7 can be reduced to:

$$ERR_{crtrOL} = -\frac{\partial Y_{crtr}}{\partial X_{crtr}} X_{crtr} \quad (8)$$

If $$\frac{\partial Y_{crtr}}{\partial X_{crtr}}$$

remains constant over $X_{crtr}$ operating range, i.e. linearity holds, then Eq. 7 can be integrated to obtain the following expression for $ERR_{crtrOL}$:

$$ERR_{crtrOL} = ERR_{crtr} - \frac{\partial Y_{crtr}}{\partial X_{crtr}} X_{crtr} \quad (9)$$

If $$\frac{\partial Y_{crtr}}{\partial X_{crtr}}$$

is expected to vary over $X_{crtr}$ operating range, and assuming Euler numerical integration, $dX_{crtr}$ can be set to $\dot{X}_{crtr}$ dt in Eq. (7) to obtain the following expression:

$$dERR_{crtrOL} = dERR_{crtr} - \frac{\partial Y_{crtr}}{\partial X_{crtr}} \dot{X}_{crtr} dt \quad (10)$$

Integrating Eq. (10) and allowing the auxiliary gain to control the process bandwidth results in an expression for open loop error in terms of $\dot{X}_{crtr}$. Accordingly, $ERR_{crtrOL}$ can be expressed as:

$$ERR_{crtrOL} = ERR_{crtr} - \int_0^t K_{aux} \frac{\partial Y_{crtr}}{\partial X_{crtr}} \dot{X}_{crtr} dt \quad (11)$$

Thus, the open loop corrector error (ERRcrtrOL) can be obtained from equation 9 described above, referred to herein as "Method A" and shown in FIG. 6B, or equation 11 described above, referred to herein as "Method B" and shown in FIG. 6C. Method A is not affected by the $X_{crtr}$ state saturation, but relies on constant partial derivative $\partial_{Ycrtr}/\partial_{Xcrtr}$ over $X_{crtr}$ operating range, i.e., linearity. Method B is more tolerant of a varying partial derivative $\partial_{Ycrtr}/\partial_{Xcrtr}$ over $X_{crtr}$ operating range but does not handle the $X_{crtr}$ state saturation. In either case, once the estimated ERRcrtrOL is determined, it is compared to a predetermined threshold value to detect the presence of a sensor failure.

A decision to select between Method A and Method B can be based on the behavior of the partial derivative $\partial_{Ycrtr}/\partial_{Xcrtr}$. For example, Method A and Method B can be selected based on the following logic:

If, (1) tight integrator limits are present; (2) a narrow $X_{crtr}$ range is present; (3) state saturation is likely; and (4) $\partial_{Ycrtr}/\partial_{Xcrtr}$ is constant then Method A is selected. If, however, (1) wide integrator limits are present; (2) a wide $X_{crtr}$ range is present; (3) state saturation is not likely; and (4) $\partial_{Ycrtr}/\partial_{Xcrtr}$ is not constant, then Method B is selected.

At times, an assumption of negligible effect of Xslvr may not yield acceptable accuracy for the purposes of detecting engine condition sensor failure. In these cases, it may be assumed that the solver states are 'fast' (i.e. fully stabilized) relative to 'slow' sensor drift. The corrector state estimator enabled linearized open loop mode is derived as described below.

$$dT_{crtr} = \frac{\partial Y_{crtr}}{\partial U_e}dU_e + \frac{\partial Y_{crtr}}{\partial X_{crtr}}dX_{crtr} + \frac{\partial Y_{crtr}}{\partial X_{slvr}}dX_{slvr} + \frac{\partial Y_{crtr}}{\partial X_{phys}}dX_{phys} \quad (12)$$

$$d\dot{X}_{slvr} = \frac{\partial \dot{X}_{slvr}}{\partial U_e}dU_e + \frac{\partial \dot{X}_{slvr}}{\partial X_{crtr}}dX_{crtr} + \frac{\partial \dot{X}_{slvr}}{\partial X_{slvr}}dX_{slvr} + \frac{\partial \dot{X}_{slvr}}{\partial X_{phys}}dX_{phys} \quad (13)$$

Based on Eq. (13), setting $d\dot{X}_{slvr}=0$, yields:

$$dX_{slvr} = -\frac{\partial \dot{X}_{slvr}}{\partial X_{slvr}}^{-1}\left\{\frac{\partial \dot{X}_{slvr}}{\partial U_e}dU_e + \frac{\partial \dot{X}_{slvr}}{\partial X_{crtr}}dX_{crtr}\right\} \quad (14)$$

Incorporating equation (14) into equation (12) yields:

$$dY_{crtr} = \frac{\partial Y_{crtr}}{\partial U_e}dU_e + \frac{\partial Y_{crtr}}{\partial X_{crtr}}dX_{crtr} - \quad (15)$$

$$\frac{\partial Y_{crtr}}{\partial X_{slvr}}\frac{\partial \dot{X}_{slvr}}{\partial X_{slvr}}^{-1}\left\{\frac{\partial \dot{X}_{slvr}}{\partial U_e}dU_e + \frac{\partial \dot{X}_{slvr}}{\partial X_{crtr}}dX_{crtr}\right\}$$

Collecting the terms in Eq. (15) yields:

$$dY_{crtr}\left\{\frac{\partial Y_{crtr}}{\partial U_e} - \frac{\partial Y_{crtr}}{\partial X_{slvr}}\frac{\partial \dot{X}_{slvr}}{\partial X_{slvr}}^{-1}\frac{\partial \dot{X}_{slvr}}{\partial U_e}\right\} \quad (16)$$

$$dU_e + \left[\frac{\partial Y_{crtr}}{\partial X_{crtr}} - \frac{\partial Y_{crtr}}{\partial X_{slvr}}\frac{\partial \dot{X}_{slvr}}{\partial X_{slvr}}^{-1}\frac{\partial \dot{X}_{slvr}}{\partial X_{crtr}}\right]dX_{crtr}$$

Disabling the corrector state estimator yields:

$$dY_{crtr} = \left\{\frac{\partial Y_{crtr}}{\partial U_e} - \frac{\partial Y_{crtr}}{\partial X_{slvr}}\frac{\partial \dot{X}_{slvr}}{\partial X_{slvr}}^{-1}\frac{\partial \dot{X}_{slvr}}{\partial U_e}\right\}dU_e + \quad (17)$$

$$\left[\frac{\partial Y_{crtr}}{\partial X_{crtr}} - \frac{\partial Y_{crtr}}{\partial X_{slvr}}\frac{\partial \dot{X}_{slvr}}{\partial X_{slvr}}^{-1}\frac{\partial \dot{X}_{slvr}}{\partial X_{crtr}}\right]dX_{crtr}$$

The analysis is the repeated with equations 16 and 17, replacing equations 1 and 2 (intermediate steps are omitted for the sake of brevity):

$$dY_{crtr} - dY_{crtrD} = \left[\frac{\partial Y_{crtr}}{\partial X_{crtr}} - \frac{\partial Y_{crtr}}{\partial X_{slvr}}\frac{\partial \dot{X}_{slvr}}{\partial X_{slvr}}^{-1}\frac{\partial \dot{X}_{slvr}}{\partial X_{crtr}}\right]dX_{crtr} \quad (18)$$

$$ERR_{crtrOL} = ERR_{crtr} - \left[\frac{\partial Y_{crtr}}{\partial X_{crtr}} - \frac{\partial Y_{crtr}}{\partial X_{slvr}}\frac{\partial \dot{X}_{slvr}}{\partial X_{slvr}}^{-1}\frac{\partial \dot{X}_{slvr}}{\partial X_{crtr}}\right]X_{crtr} \quad (19)$$

()

$$ERR_{crtrOL} = \quad (20)$$

$$ERR_{crtr} - \int_0^t K_{aux}\left[\frac{\partial Y_{crtr}}{\partial X_{crtr}} - \frac{\partial Y_{crtr}}{\partial X_{slvr}}\frac{\partial \dot{X}_{slvr}}{\partial X_{slvr}}^{-1}\frac{\partial \dot{X}_{slvr}}{\partial X_{crtr}}\right]\dot{X}_{crtr}dt$$

Figure 6D:
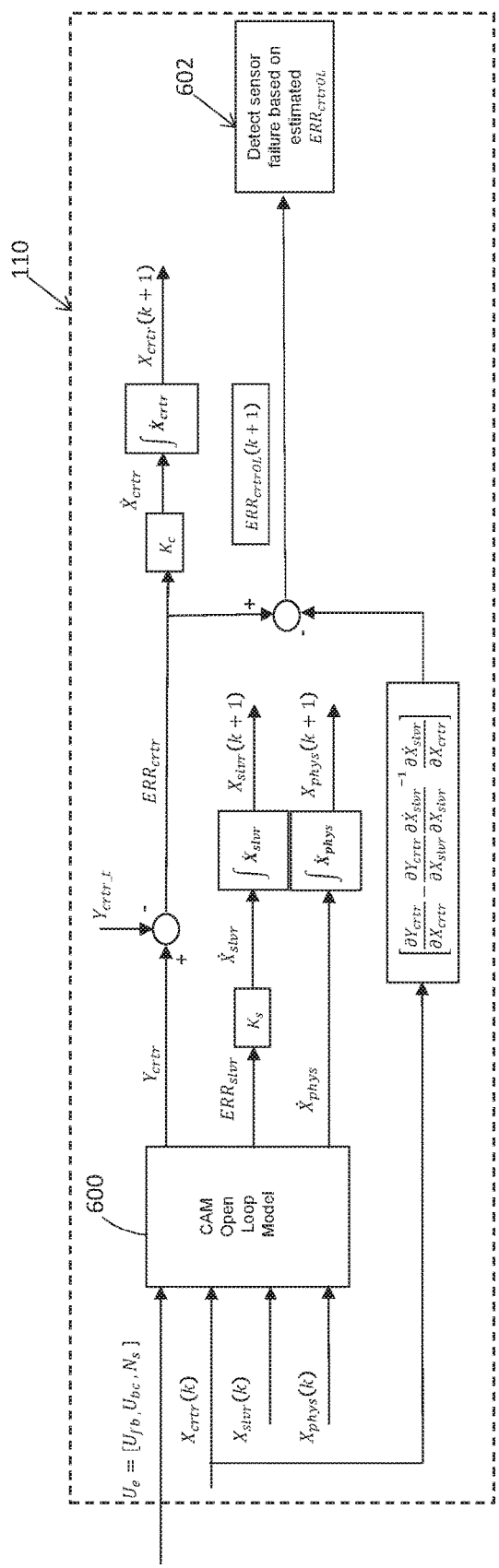
Figure 6E:
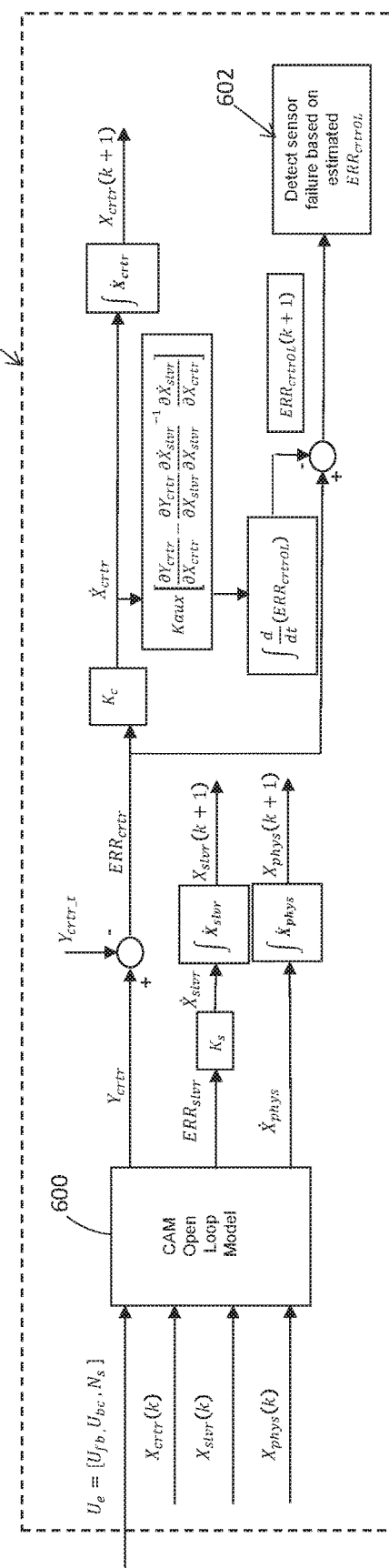

Thus, Equations 19 and 20 above describe variations to methods A and B, which in some cases may yield more robust engine condition sensor failure detection compared to equations 9 and 11 described above. Equation 19 is referred to herein as "Method C", while equation 20 is referred to herein as "Method D." Method C is illustrated with respect to FIG. 6D, while Method D is illustrated with respect to FIG. 6E. The difference is the inclusion of the Xcrtr and XcrtrDot gain operations, which are specific to method C and D respectively. The methodology works for detecting failures in both single channel and dual channel sensor applications. In dual channel sensor application, the methodology distinguishes a single channel sensor drift from dual channel sensor drifts. Although Methods A, B, C, and D are discussed in detail above, other variants can be devised, e.g. assuming physics states are also 'fast' relative to 'slow' sensor drift, etc.

Figure 7:
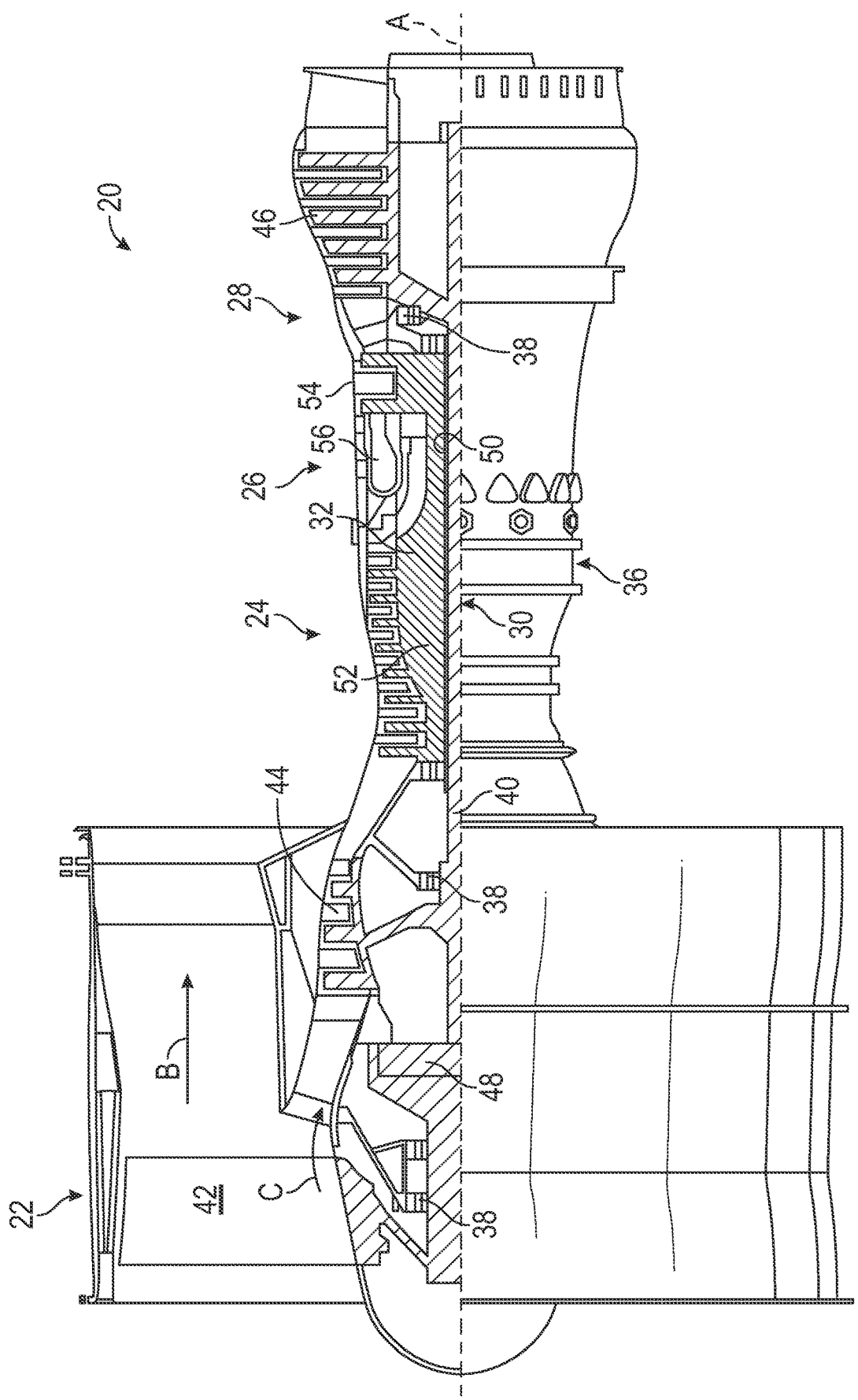
FIG. 7 is a schematic diagram of a turbine engine capable of being controlled by the engine control system illustrated in FIG. 1 according to a non-limiting embodiment.

FIG. 7 schematically illustrates a gas turbine engine 20 capable of being controlled by the engine control system 100. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low-speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis (A) which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft./second (350.5 m/sec).

As described herein, an engine control system is provided which includes an engine controller capable of detecting and accommodating for both soft failures (e.g., sensor in-range failures) hard failures (e.g., actuator failures). The engine control module is also configured to utilize synthesized engine response parameters and/or sensor response parameters to distinguish between a faulty actuator and a faulty actuator sensor. In addition, the engine controller can accommodate or compensate for the detected faults by utilizing the synthesized engine response parameters and/or synthesized sensor response parameters to invoke a "limp home" mode which serves to operate the engine at basic operating conditions (e.g., low or minimum speed, minimum thrust, minimum load, etc.) so that the aircraft can be brought to a desire location for inspection.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine control system comprising:
an electronic hardware engine controller in signal communication with at least one engine sensor that measures an engine operating parameter of an engine, the engine controller configured to generate at least one synthesized engine operating parameter and to calculate an error value between the engine operating parameter and the at least one synthesized engine operating parameter, wherein the engine controller is configured to selectively operate in a correcting mode and a non-correcting mode, periodically calculates and monitors a corrector error parameter that is dynamically estimated based on outputs of an open-loop model (OLM) while operating in the correcting mode, compares the corrector error parameter to a threshold, and determines a fault associated with the at least one engine sensor based on the comparison, and wherein the engine controller is configured to:

activate the correcting mode when the at least one engine sensor operates without a fault to correct the at least one synthesized engine operating parameter based on the engine operating parameter and reduce the error value;

deactivate the correcting mode in response to detecting the fault to decouple the engine operating parameter from the at least one synthesized engine operating parameter; and perform a second diagnostic to determine if the fault is a single channel fault associated with the at least one engine sensor, or a dual channel fault associated with the at least one engine sensor.

2. The engine control system of claim 1, wherein the at least one engine sensor includes a first engine condition sensor and a second engine condition sensor, and wherein the single channel fault indicates either the first engine condition sensor and the second engine condition sensor is a faulty sensor, and wherein the dual channel fault indicates both the first engine condition sensor and the second engine condition sensor are faulty sensors.

3. The engine control system of claim 2, wherein the engine controller determines an open loop corrector error based on the error value, and detects the faulty sensor based on a comparison between the open loop corrector error and an expected sensor tolerance range of the at least one engine sensor.

4. The engine control system of claim 3, wherein the engine controller detects the faulty sensor in response to the open loop corrector error exceeding the expected sensor tolerance range.

5. The engine control system of claim 4, further comprising at least one actuator that controls operation of the engine, wherein the engine controller controls the at least one actuator based on both the synthesized engine operating parameter and the engine operating parameter when operating in the correcting mode, and wherein the engine controller controls the at least one actuator based on the synthesized engine operating parameter while disregarding the engine operating parameter when operating in the non-correcting mode.

6. The engine control system of claim 5, wherein the engine controller determines the open loop corrector error while operating in the correcting mode, wherein the engine controller deactivates the correcting mode in response to detecting the fault and performs a diagnostic to determine whether the fault is one of a single channel fault associated with one of the first engine condition sensor or the second engine condition sensor, or a dual channel fault of both the first and second engine condition sensors.

7. The engine control system of claim 6, wherein, while operating in the correcting mode, the open loop corrector error estimates an error correction for correcting a drift of the engine operating parameter in response to invoking the non-correcting mode.

8. A method of controlling a turbine engine, the method comprising:

controlling the turbine engine using at least one actuator configured to operate at a plurality of different positions;

measuring, via at least one engine sensor, an engine operating parameter;

generating, via an electronic hardware engine controller, at least one of a synthesized engine operating parameter, the synthesized engine operating parameters generated independently from the measured engine operating parameters; and controlling the at least one actuator based on the synthesized engine operating parameter in response to detecting a faulty actuator, a faulty actuator sensor, or a faulty engine sensor, wherein the engine controller is configured to selectively operate in a correcting mode and a non-correcting mode, periodically calculates and monitors a corrector error parameter that is dynamically estimated based on outputs of an open-loop model (OLM) while operating in the correcting mode, compares the corrector error parameter to a threshold, and determines a fault associated with the at least one engine sensor based on the comparison, and wherein the engine controller is configured to;

activate the correcting mode when the at least one engine sensor operates without a fault to correct the at least one synthesized engine operating parameter based on the engine operating parameter and reduce the error value;

deactivate the correcting mode in response to detecting the fault to decouple the engine operating parameter from the at least one synthesized engine operating parameter; and perform a second diagnostic to determine if the fault is a single channel fault associated with the at least one engine sensor, or a dual channel fault associated with the at least one engine sensor.

9. The method of claim 8, wherein the at least one engine sensor includes a first engine condition sensor and a second engine condition sensor, and wherein the single channel fault indicates either the first engine condition sensor and the second engine condition sensor is a faulty sensor, and wherein the dual channel fault indicates both the first engine condition sensor and the second engine condition sensor are faulty sensors.

10. The method of claim 9, further comprising detecting at least one fault associated with at least one of the first engine condition sensor and the second engine condition sensor based on a comparison between a channel differential threshold value and a cross-channel mismatch value associated with first and second engine condition sensors.

11. The method of claim 10, further comprising detecting a single channel fault associated with one of the first engine condition sensor or the second engine condition sensor in response to the cross-channel mismatch value exceeding the channel differential threshold value.

12. The method of claim 11, further comprising replacing the measured engine operating parameter output from the faulty engine condition sensor with the synthesized sensor response, and controlling the position of the at least one actuator using the synthesized engine operating parameter and the measured engine operating parameter output from the non-faulty engine condition sensor.

13. The method of claim 12, further comprising:
  determining an expected sensor tolerance range of the first and second engine condition sensors; and
  determining a fault corresponding to at least one of the first and second engine condition sensors based on the expected sensor tolerance range.

14. The method of claim 13, further comprising detecting a dual channel fault of both the first and second engine condition sensors in response to the measured engine operating parameter deviating outside the expected sensor tolerance range.

15. The method of claim 14, further comprising:
  replacing the measured engine operating parameters output from the first and second engine condition sensors with the synthesized engine operating parameter following detection of the dual channel fault; and
  adjusting the position of the at least one actuator based on the synthesized engine operating parameter.

* * * * *